US009019271B2

(12) United States Patent  
Liang (10) Patent No.: US 9,019,271 B2
(45) Date of Patent: Apr. 28, 2015

(54) Z-CULLING METHOD, THREE-DIMENSIONAL GRAPHICS PROCESSING METHOD AND APPARATUS THREREOF

(75) Inventor: Ai-Min Liang, Beijing (CN)

(73) Assignee: VIA Technologies, Inc., New Taipei (TW)

( * ) Notice: Subject to any disclaimer, the term of this patent is extended or adjusted under 35 U.S.C. 154(b) by 241 days.

(21) Appl. No.: 13/480,477

(22) Filed: May 25, 2012

(65) Prior Publication Data

US 2012/0299910 A1   Nov. 29, 2012

(30) Foreign Application Priority Data

May 25, 2011   (CN) .......................... 2011 1 0137364

(51) Int. Cl.
    G06T 15/40 (2011.01)
(52) U.S. Cl.
    CPC ........... *G06T 15/405* (2013.01); *G06T 2200/28* (2013.01)
(58) Field of Classification Search
    None
    See application file for complete search history.

(56) References Cited

U.S. PATENT DOCUMENTS

| 6,246,415 B1 * | 6/2001 | Grossman et al. ............ 345/422 |
| 6,885,378 B1 * | 4/2005 | Tsai et al. ..................... 345/557 |
| 6,937,244 B2 * | 8/2005 | Hong ............................. 345/544 |
| 7,450,120 B1 * | 11/2008 | Hakura et al. ................. 345/421 |
| 7,493,445 B2 * | 2/2009 | Harada .......................... 711/118 |
| 2009/0295816 A1 * | 12/2009 | Kallio ............................ 345/553 |

FOREIGN PATENT DOCUMENTS

| TW | 449730 | 8/2001 |
| TW | 200744019 | 12/2007 |
| TW | 201044091 | 12/2010 |

OTHER PUBLICATIONS

K Gao, "Coarse-Z Filter: A Low-bandwidth Algorithm and Its Hardening for Hidden Surface Removal", China Masters' Theses Full-Text Database, vol. 5, May 31, 2006, pp. 1-39.
"First Office Action of China Counterpart Application", issued on Feb. 5, 2013, p. 1-p. 6.
"Office Action of Taiwan Counterpart Application", issued on Jul. 3, 2014, p. 1-p. 16.

* cited by examiner

*Primary Examiner* — Andrew Yang
(74) *Attorney, Agent, or Firm* — Jianq Chyun IP Office (57) ABSTRACT

A Z culling method, a three-dimensional graphics processing method using Z-culling, and an apparatus thereof are provided. The Z-culling method includes the following steps. A Z cache memory is provided to buffer a cover mask and a dynamic maximum depth value corresponding to each tile. A draw mask, a draw maximum depth value, and a draw minimum depth value calculated according to the tile and a drawn part are obtained. Moreover, whether the drawn part is completely included in a known part of the cover mask is judged, and coordinated with a comparison of the draw minimum depth value and the dynamic maximum depth value, so as to determine whether to discard the drawn part and whether to update the cover mask and the dynamic maximum depth value in the Z cache memory. Accordingly, the bandwidth taken up in the system memory is reduced efficiently.

12 Claims, 7 Drawing Sheets

Z-CULLING METHOD, THREE-DIMENSIONAL GRAPHICS PROCESSING METHOD AND APPARATUS THREROF

CROSS-REFERENCE TO RELATED APPLICATION

This application claims the priority benefit of China application serial no. 201110137364.0, filed on May 25, 2011. The entirety of the above-mentioned patent application is hereby incorporated by reference herein and made a part of this specification.

BACKGROUND OF THE INVENTION

1. Technical Field

The invention relates generally to a three-dimensional (3D) graphics processing method, and more particularly to a Z-culling method, a 3D graphics processing method using Z-culling and a 3D graphics processing apparatus thereof.

2. Related Art

Z-buffering techniques, also known as depth buffering or Z-testing, are used for managing the image depth coordinates in 3D graphics processing, in which parts of a rendered 3D scene are decided as visible, and other parts are decided as hidden.

For example, when a graphics processing unit (GPU) which supports a Z-buffering technique renders a 3D object in a 3D image, each processed pixel typically has a Z value representing the depth value of the 3D object on the screen. The Z values are stored into a corresponding location in a buffer referred to as a Z-buffer or a depth buffer. The Z-buffer is usually arranged as a two-dimensional (2D) array using the X value and Y value coordinates of the pixels, the 2D array being used for storing the depth value of each pixel. If another 3D object of the scene is rendered in the same pixel, then the graphics card compares the two depth values and keeps the object closer to the observer, saving the chosen pixel depth in the Z-buffer. The aforementioned Z-buffering technique may also be referring to as depth culling or Z-culling.

However, in the Z-buffering algorithm mentioned above, the pixel data of the 3D object and the depth values thereof must be first calculated. Moreover, no matter whether the observer is able to see the 3D object in the end or not, the pixel depths stored into the Z-buffer must be retrieved and compared with the calculated depth values of the pixel data. This process takes up an enormous bandwidth in the system memory. Oftentimes, the bandwidth between the system memory and the GPU is a major bottleneck affecting the graphics processing speed, especially in today's applications with 3D scenes having considerably high depth complexity. Therefore, effectively managing the memory traffic of the Z-buffer is imperative in 3D graphics processing techniques.

In order to reduce the number of access to the Z-buffer and to resolve the issues therein, a plurality of methods has been developed such as the coarse Z-culling technique. The coarse Z-culling technique rasterizes the screen and divides the screen into equal sized tiles. The 3D object is labeled, and a Z-culling buffer is established in the system memory so as to record attribute parameters such as the maximum depth value and the minimum depth value of the image in each tile. When a new 3D object is being processed, the coarse Z-culling technique determines whether the 3D object in the tiles has been covered by reading the attribute parameters in the system memory, so as to directly discard the covered part.

However, the current coarse Z-culling techniques often access the Z-culling buffer in the system memory during processing, and therefore a significant portion of the bandwidth is still taken up. In addition, during the computation process of the current coarse Z-culling techniques (e.g., confirming the relative depth positioning relationships), there are large and complex equations, complicated decisions, and a great quantity of value comparisons. Due to the need for simultaneous calculations of the equations in the algorithm, the hardware implementation becomes rather complex in view of the computational speed. Accordingly, in 3D graphics processing techniques, it is imperative to continually reduce the usage rate of the system memory bandwidth while lowering the computational complexity.

SUMMARY OF THE INVENTION

In some embodiments of the invention, a Z-culling method is provided. An exclusive Z cache memory is added so that the read and write frequency on the system memory is reduced. Accordingly, the access frequency of the system memory and the bandwidth taken up are lowered.

In some embodiments of the invention, a 3D graphics processing method using Z-culling is provided. The Z-culling process in the method can use an exclusive Z cache memory to reduce the read and write frequency on the system memory. Accordingly, the access frequency of the system memory and the bandwidth taken up are lowered, thereby increasing the real-time graphics processing speed.

From another perspective, in some embodiments of the invention, a 3D graphics processing apparatus using Z-culling is provided. The Z-culling module in the apparatus can use an exclusive Z cache memory to reduce the read and write frequency on the system memory. Accordingly, the access frequency of the system memory and the bandwidth taken up are lowered, thereby increasing the real-time graphics processing speed.

Embodiments of the invention provide a Z-culling method adapted for a 3D graphics processing apparatus, the Z culling method including the following steps. A Z cache memory is provided to buffer a cover mask and a dynamic maximum depth value corresponding to at least one of the tiles of a rasterized screen. The screen may be rasterized into a plurality of tiles. The cover mask represents a pixel location of a known part in the tile, and the dynamic maximum depth value is the maximum value of the depth distances between each pixel in the known part and an observer's view point.

Moreover, a draw mask, a draw maximum depth value, and a draw minimum depth value calculated according to the tile and a drawn part are obtained. The drawn part are pixels of a plane (e.g. a triangle) constructing a 3D graphics projected on the tile. The draw mask represents the pixel location of the drawn part in the tile. The draw minimum depth value is the minimum value of the depth distances between each pixel in the drawn part and the observer's view point. Moreover, the draw maximum depth value is the maximum value of the depth distances between each pixel in the drawn part and the observer's view point. Furthermore, whether the pixel location of the drawn part is completely included in the pixel location of the known part is judged, coordinated with a comparison of the draw minimum depth value and the dynamic maximum depth value, so as to determine whether to discard the drawn part and whether to update the cover mask and the dynamic maximum depth value buffered in the Z cache memory.

According to an embodiment, the Z-culling method further includes the following steps. When the Z cache memory is full, the data in the Z cache memory is stored back in a system memory of the 3D graphics processing apparatus.

From another perspective, embodiments of the invention provide a 3D graphics processing method using Z-culling, adapted for a 3D graphics processing apparatus to display a 3D scene on a screen, the 3D graphics processing method including the following steps. The 3D scene is taken apart to form a plurality of planes (e.g. triangles), and the screen is rasterized into a plurality of tiles, so as to calculate a draw mask, a draw maximum depth value, and a draw minimum depth value corresponding to the tile and a drawn part. Moreover, the draw mask, the draw maximum depth value, and the draw minimum depth are stored into a system memory of the 3D graphics processing apparatus. A Z-culling process is performed according to the draw mask, the draw maximum depth value, the draw minimum depth value, and a Z cache memory, so as to determine whether to discard the drawn part. When the drawn part is determined to be kept, a pixel rendering process is performed according to the kept drawn part.

The Z-culling process may include the following steps. The Z cache memory is provided, in which the Z cache memory buffers a cover mask and a dynamic maximum depth value corresponding to each tile. The draw mask, the draw maximum depth value, and the draw minimum depth value corresponding to the drawn part and the tile are obtained. Furthermore, whether the pixel location of the drawn part is completely included in the pixel location of the known part is judged, coordinated with a comparison of the draw minimum depth value and the dynamic maximum depth value, so as to determine whether to discard the drawn part and whether to update the cover mask and the dynamic maximum depth value in the Z cache memory.

In another perspective, embodiments of the invention provide a 3D graphics processing apparatus using Z-culling, adapted for displaying a 3D scene on a screen. The 3D graphics processing apparatus includes a geometry conversion module, a system memory, a Z-culling engine, a Z-buffering engine, and a pixel rendering engine. The geometry conversion module takes apart the 3D scene to form a plurality of planes (e.g. triangles), and rasterizes the screen into a plurality of tiles, so as to calculate a draw mask, a draw maximum depth value, and a draw minimum depth value corresponding to the tile and a drawn part. The drawn part is the pixel data of the plane projected to the tile. The draw mask, the draw maximum depth value, and the draw minimum depth value may be stored into the system memory. The Z-culling engine performs a Z-culling process according to the draw mask, the draw maximum depth value, and the draw minimum depth value, so as to determine whether to discard the drawn part. The Z-buffering engine performs a Z-buffering process using the undiscarded drawn part, so as to update pixels in the tile. The pixel rendering engine performs a pixel rendering process according to updated pixels of the tile.

The Z-culling engine includes a Z read module, a Z cache memory, a Z test module, and a Z update module. The Z read module obtains from the system memory the draw mask, the draw maximum depth value, and the draw minimum depth value corresponding to the drawn part and the tile. The Z cache memory buffers the cover mask and the dynamic maximum depth value corresponding to the tile. The Z test module judges whether the pixel location of the drawn part is completely included in the pixel location of the known part, and coordinates with a comparison of the draw minimum depth value and the dynamic maximum depth value, so as to determine whether to discard the drawn part. The Z update module uses a determined result of the Z test module so as to update the cover mask and the dynamic maximum depth value of the Z cache memory.

In summary, according to embodiments of the invention, an exclusive Z cache memory is added in the Z-buffer module so that when the Z-culling method is performed, the cache memory is employed to reduce the read and write frequency on the system memory. In other words, when performing Z-culling methods in the past, frequent read and write operations need to be performed on the Z-buffer in the system memory. Embodiments of the invention move the frequently read and written data (e.g. masks and depth data) from the Z-buffer to the cache memory for processing. Accordingly, the access frequency of the system memory is lowered and the bandwidth taken up is reduced.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Descriptions of the invention are given with reference to the exemplary embodiments illustrated with accompanied drawings, wherein same or similar parts are denoted with same reference numerals. Moreover, elements/components/notations with same reference numerals represent same or similar parts in the drawings and embodiments.

In current 3D graphics processing methods, the Z-buffering techniques are usually performed in two parts. In a first part, the 3D scene is labeled by using the tile on the screen as a unit, so as to roughly identify the approximate location of the 3D scene in each tile. Moreover, whether the 3D scene has been completely covered is determined. This first part is referred to as the coarse Z-culling process, or the Z-culling process. After completing the first part, in a second part, the present embodiment compares the coverage state of each 3D scene by using the pixel as a unit, and thereby a precise Z-culling process is performed.

In some embodiments, after completing the Z-culling process, the pixel content of each 3D scene can be directly drawn by using the pixel as a unit. In other words, after completing the Z-culling process, in some embodiments a more detailed z-culling process directly follows for drawing the 3D scene in each pixel. Therefore, the second part of the Z-buffering technique may be a more detailed z-culling process which use smaller units. The 3D graphics processing methods in these two parts are mutually independent, and each has its own complete process flow. Therefore, the embodiments of the invention in the disclosure mainly describe the Z-culling process in the first part.

Figure 1:
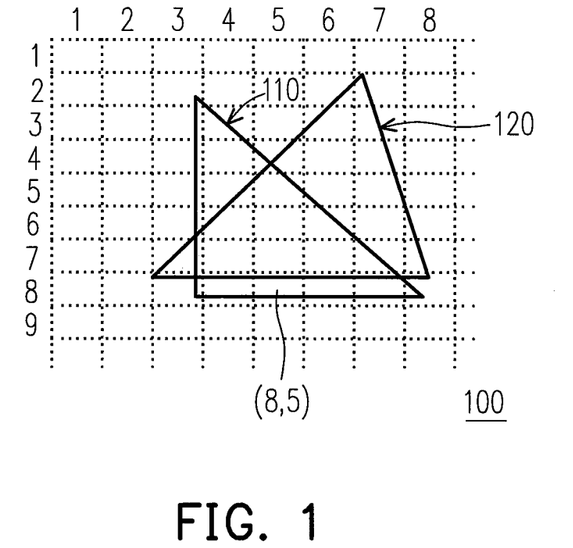
FIG. 1 is a schematic view of two overlapping triangles projected on a screen according to an exemplary embodiment.
Figure 2:
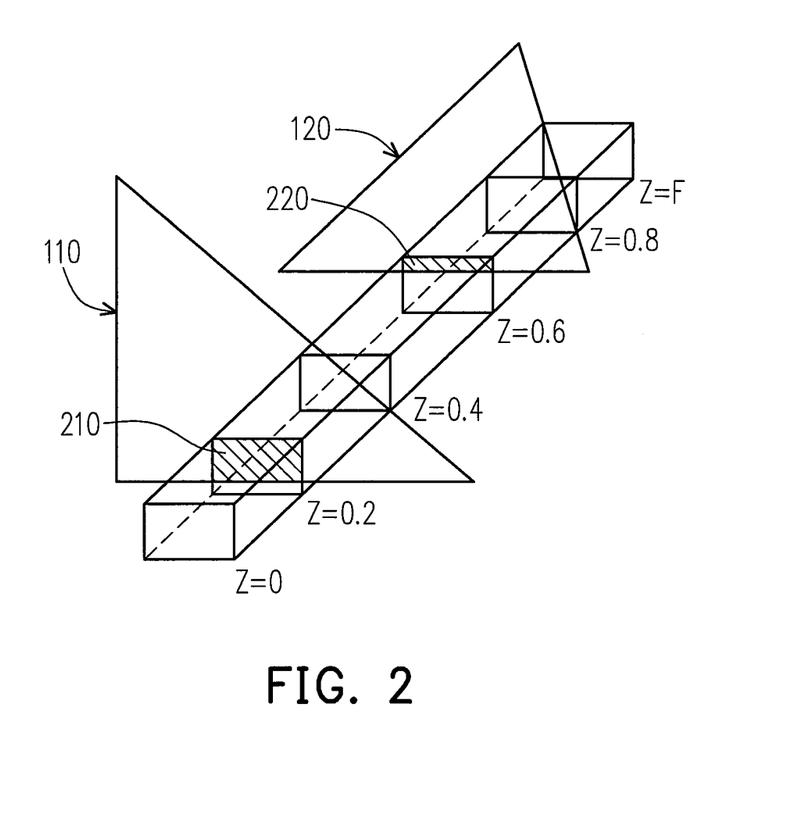
FIG. 2 is a perspective view of a tile (8,5) in FIG. 1 according to an exemplary embodiment.

FIG. 1 is a schematic view of a triangle 110 and a triangle 120 projected on a screen 100 according to an exemplary embodiment, and FIG. 2 is a perspective view of a tile (8,5) in FIG. 1. Due to the geometric properties of the triangle, for example the three apexes of the triangle being located on a same plane, a 3D object can be represented based on a plurality of triangles. The triangles 110 and 120 are used here as an example of a 3D object. A part of the two triangles 110 and 120 are overlapping, and the triangle 110 is located in front and covers the overlapped area with triangle 120. A 3D graphics processing method may rasterize the triangles 110 and 120, for example by the raster lines shown in FIG. 1. That is, the screen may be divided into a plurality of equal sized tiles, for example tile (8,5), and the triangles 110 and 120 are projected and transformed according to these tiles. Generally speaking, the tile may be a rectangular region having lengths 8 pixels times 8 pixels (8×8). However, embodiments of the invention are not limited thereto, and the size of the tile area may be adjusted according to design requirements.

In order to facilitate description, the tile (8,5) in FIG. 1 has been drawn in FIG. 2 as see-through in the depth direction. A depth value (Z) extends from "0" near the observer's view point to "F" of the background (i.e. extending to infinity). Looking in the depth direction, a drawn part 210 of the triangle 110 located in the tile (8,5) overlaps a drawn part 220 of the triangle 120 in the tile (8,5). The Z-culling technique may provide a Z-culling buffer located in the system memory, so as to store attribute parameters such as a maximum depth value, a cover mask CM, or a draw mask DM.

The maximum depth value is defined as the maximum value of the depth distances between each pixel of a drawn part and the observer's view point, the drawn part being uncovered and closest to the view point, after each drawn part in the corresponding tile has been drawn. The cover mask CM represents the drawn pixel location in the corresponding tile. In the present embodiment and each embodiment hereafter, the drawn pixel location is referred as a known part KP. The draw mask DM represents the pixel location of the projection of the drawn part being drawn this time projected in the corresponding tile. Examples are illustrated below to describe each parameter in the Z-culling buffer, so as to provide a better understanding of the present embodiment.

Figure 3:
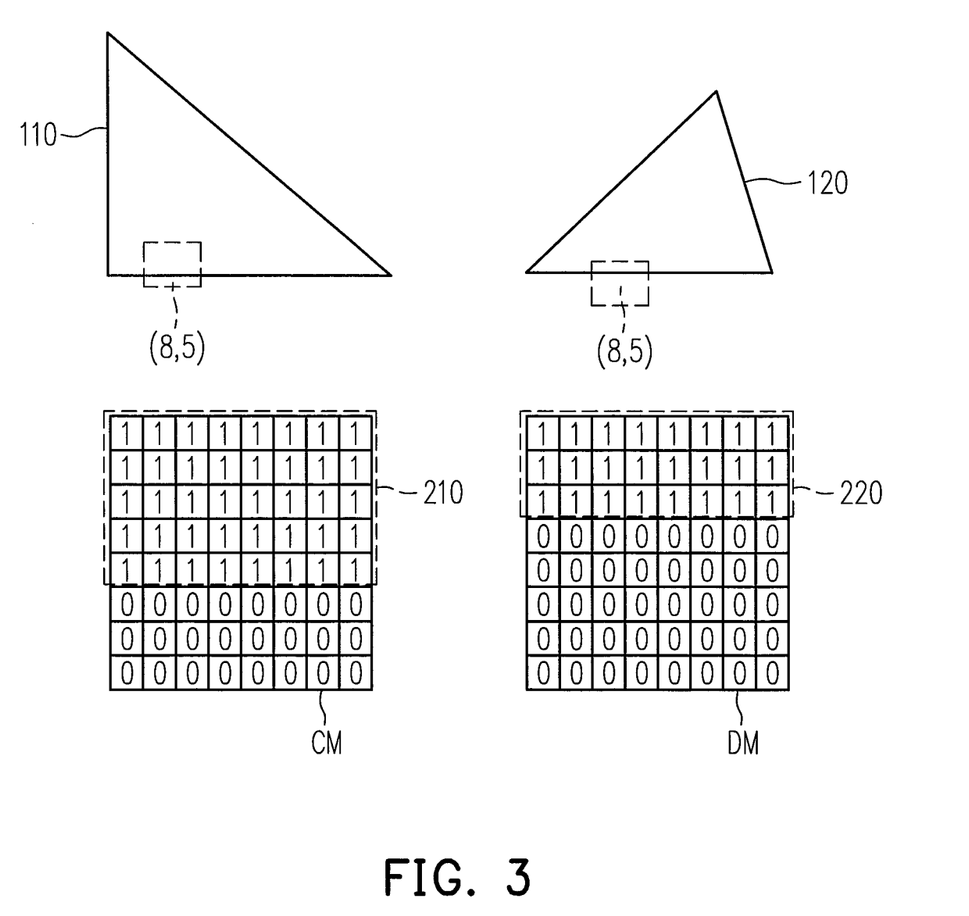
FIG. 3 is a schematic view of a cover mask and a draw mask according to an exemplary embodiment.

Assume the 3D graphics processing method first processes the triangle 110, and the minimum and maximum z-values of the drawn part 210 are "0.2" and "0.4", respectively. Therefore, the maximum depth value field in the Z-culling buffer (8,5) is updated to "0.4", and the cover mask CM field in the Z-culling buffer (8,5) is updated as shown in FIG. 3, in which FIG. 3 is a schematic view of the cover mask CM and the draw mask DM according to an exemplary embodiment. Since the tile is a rectangular region of 8×8 pixels, the cover mask CM and the draw mask DM are both 8×8 masks. In the fields containing the cover mask CM and the draw mask according to the present embodiment, "1" represents that the pixel at this location in the tile (8,5) has been drawn and have a depth value not at infinity. On the other hand, "0" represents the pixel at this location has yet to be drawn, and the depth value thereof can be set at infinity. However, "0" and "1" are used here merely for labeling and indicating whether an object exists at this pixel location, but not for indicating the depth position of the object. The areas with pixels labeled as "1" may form the drawn part 210 (e.g., may also be referred as the known part in the present embodiment), although embodiments of the invention are not limited thereto. Other applications may also use "1" to represent the pixel locations that have not been drawn, and use "0" to represent the drawn pixel locations.

In comparison, the minimum and maximum z-values of the drawn part 220 currently being drawn are "0.6" and "0.8", respectively, and the draw mask DM of the drawn part 220 are as shown in FIG. 3, for example. Accordingly, when processing the triangle 120, the 3D graphics processing method provides the draw mask DM corresponding to the drawn part 220 in FIG. 3, as well as the minimum z-value "0.6" and the maximum z-value "0.8" in the pixels thereof. The cover mask CM and the draw mask DM are compared. Since the 2D pixel location of the drawn part 220 on the screen (abbreviated as the pixel location of the drawn part 220) includes the pixel location of the drawn part 210 that has been drawn previously, and the minimum z-value "0.6" of the drawn part 220 is greater than the maximum z-value field "0.4" in the Z-culling buffer (8,5), which means the minimum z-value "0.6" of the drawn part 220 is greater than the maximum z-value of the drawn part 210, it can be known that the drawn part 220 is completely covered by the drawn part 210. Accordingly, the Z-culling method according to an embodiment of the invention can directly discard the drawn part 220. Moreover, the drawn part 220 is not needed to perform the subsequent Z-buffering process.

An embodiment of the invention adds an exclusive Z cache memory in the Z-culling module, and data information (e.g. masks and depth data) needing frequent read and write operations are moved into the cache memory for processing. The cache memory lowers the read and write frequency on the system memory, and accordingly lowers the access frequency of the system memory and the bandwidth taken up. Thereby, the issue in current techniques is resolved, where the Z-culling buffer is established in the system memory, and frequent access to the Z-culling buffer as required in the Z-culling process takes up a significant portion of the bandwidth. Additionally, the computation time of the Z-culling module is saved and the bandwidth used is reduced.

Figure 4:
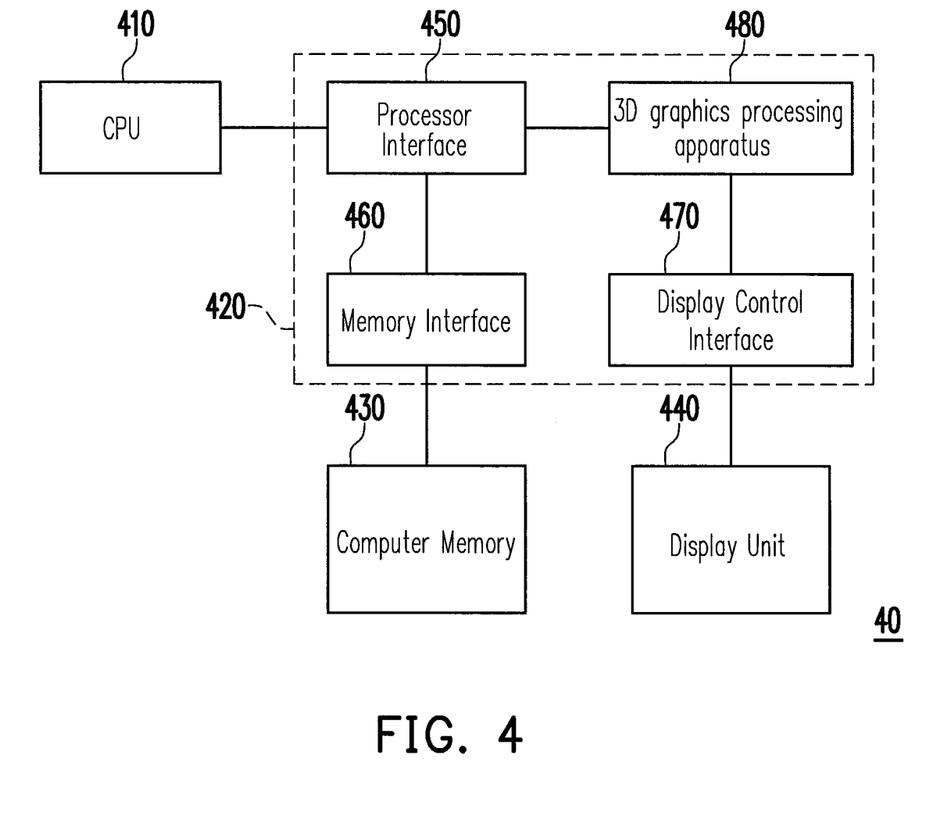
FIG. 4 is a block diagram of a computer system according to an exemplary embodiment.

In order to implement the embodiments of the invention, a computer system 40 in FIG. 4 is used as an example, in which FIG. 4 is a block diagram of the computer system 40 according to an exemplary embodiment. In the present embodiment, the computer system 40 may be a personal computer, a notebook computer, an electronic gaming system, or related hardware. The computer system 40 includes a central processing unit (CPU) 410, a display device 420, a computer memory 430, and a display unit 440.

The CPU 410 controls the operation of the computer system 40, for example in executing programs, information processing, and computations. Moreover, the program codes, information, and data needed during the operational period are buffered in the computer memory 430. The display device 420 (e.g. a graphics card) is specialized in image and graphical computations and image display, and uses bridge interfaces such as a processor interface 450, a memory interface 460, and a display control interface 470 to respectively couple to the CPU 410, the computer memory 430, and the display unit 440 (e.g. a liquid crystal display). In the present embodiment, the display device 420 further includes a 3D graphics processing unit (GPU) 480, which specifically performs computations for 3D graphics. Accordingly, the Z-culling method and the 3D graphics processing method of Z-culling are implemented.

Figure 5:
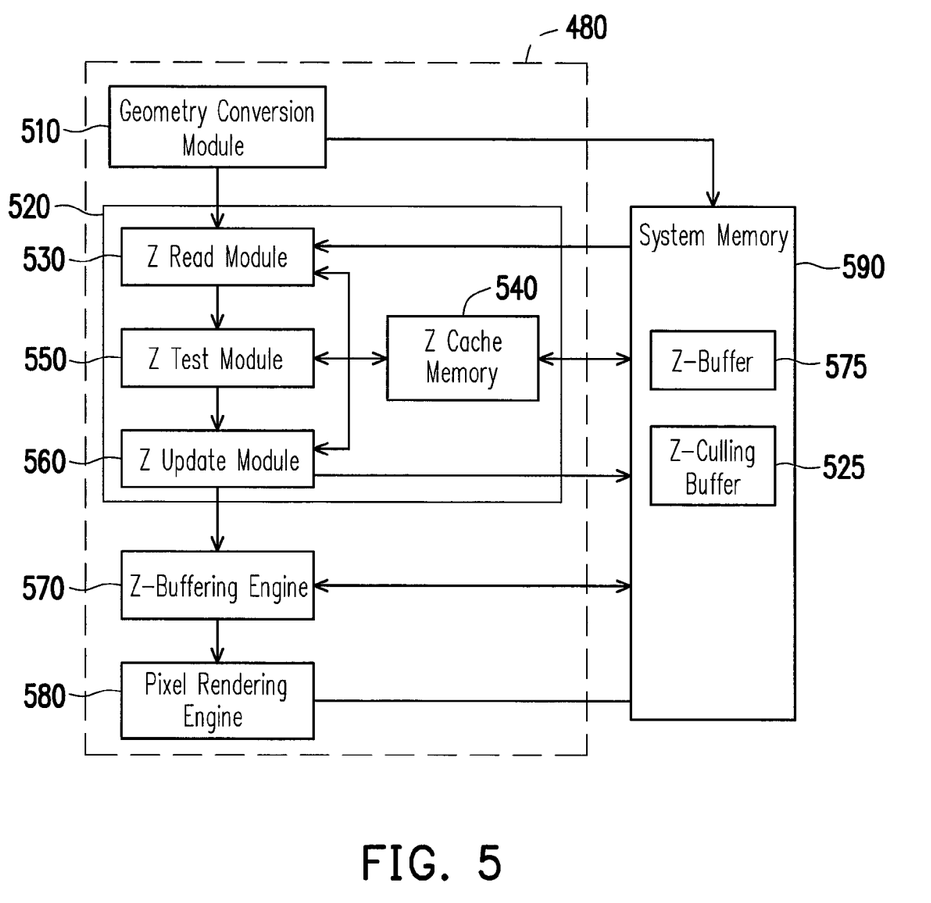
FIG. 5 is a block diagram of a 3D graphics processing apparatus using Z-culling according to an exemplary embodiment.
Figure 6:
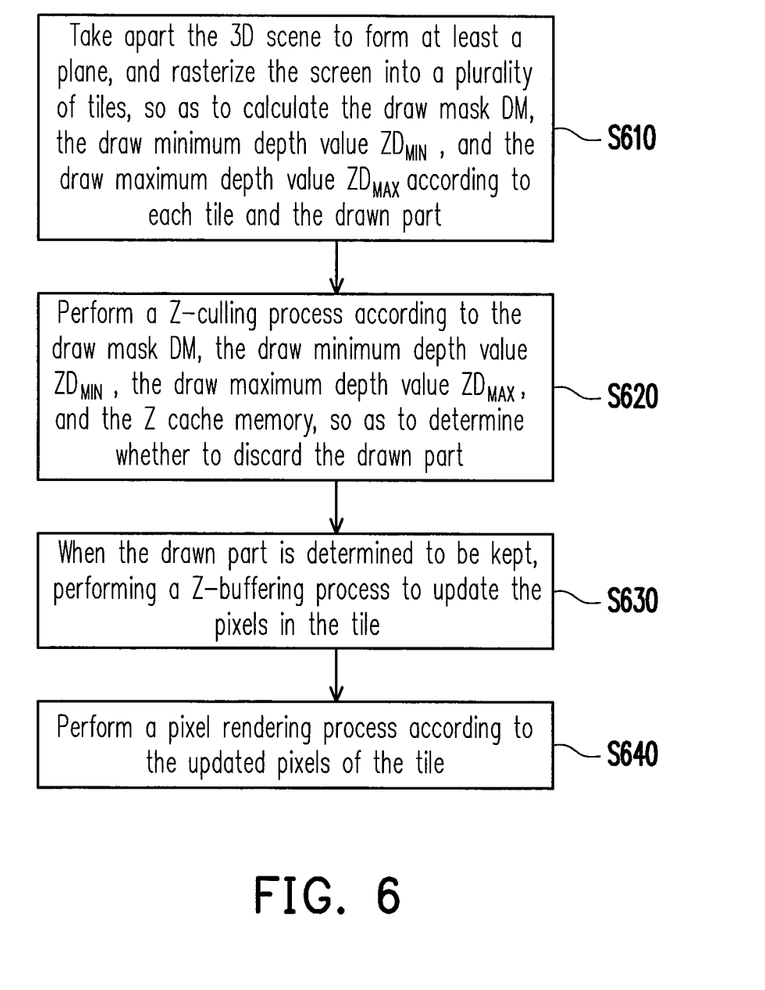
FIG. 6 is a flow diagram of a 3D graphics processing method using Z-culling according to an exemplary embodiment.

FIG. 5 is a block diagram of a 3D graphics processing apparatus 480 according to an exemplary embodiment. FIG. 6 is a flow diagram of a 3D graphics processing method according to an exemplary embodiment. With reference to FIGS. 4 and 5, a 3D graphics processing apparatus 480 coupled to a system memory 590 may display a 3D scene on a screen of the display unit 440 in FIG. 4. The 3D graphics processing apparatus 480 includes a geometry conversion module 510, a Z-culling engine 520, a Z-buffering engine 570, and a pixel rendering engine 580. Moreover, the system memory 590 includes a Z-culling buffer 525 and a Z-buffer 575 for executing the 3D graphics processing method shown in FIG. 6.

The Z-culling engine 520 includes a Z read module 530, a Z cache memory 540, a Z test module 550, and a Z update module 560 for implementing the Z-culling method described by Steps 620 and 630 in FIG. 6. The system memory 590 may be the computer memory 430 of the computer system 40, or the system memory 590 may be a display memory used exclusively for 3D image processing on the display device 420, and embodiments of the invention are not limited thereto.

Moreover, as the disclosure earlier shows, in some embodiments, after the 3D graphics processing apparatus 480 uses the Z-culling engine 520 to complete the Z-culling process, the pixel rendering engine 580 can be directly used to perform the pixel rendering process, so as to draw the 3D scene in each pixel, and the subsequent pixel Z-buffering process does not need to be performed again. Therefore, the 3D graphics processing apparatus 480 in some embodiments may not need the Z-buffering engine 570, and Step 630 in FIG. 6 may also be omitted.

The 3D graphics processing method of the present embodiment is described using the 3D graphics processing apparatus 480 in FIG. 5 and FIG. 6 in support. In a Step S610, the geometry conversion module 510 takes apart a 3D object to form a plurality of primitives, in which the primitives may be formed by dots, line segments, and planes (e.g. triangles), and the 3D object may be defined by the apexes of the primitives. The triangle is used as an example of the primitive in the present embodiment. The geometry conversion module 510 takes apart the 3D object and forms a plurality of triangles. The screen is rasterized and divided into a plurality of tiles, so that the triangles are projected on the tiles of the screen, and the drawn part corresponding to each tile is obtained (e.g., the drawn parts 210 and 220 respectively corresponding to the triangles 110 and 120 in the tile (8,5) as shown in FIGS. 2 and 3). In other words, the drawn parts are a part of the triangles constructing the 3D scene. Moreover, the drawn parts are the projections of the triangles on the screen and the pixels located in the tile.

Furthermore, the geometry conversion module 510 uses the tile and the drawn parts in order to calculate a draw mask DM, a draw maximum depth value $ZD_{MAX}$, and a draw minimum depth value $ZD_{MIN}$. The draw mask DM, which may indicate the pixel location in the tile of the drawn part currently being drawn, has been depicted and described in FIG. 3, and therefore further elaboration thereof is omitted hereafter. The draw minimum depth value $ZD_{MIN}$ is the smallest value of the depth distances between each pixel in the drawn part and the observer's view point (e.g., the observer's view point being at the location where Z equals to "0"). The draw maximum depth value $ZD_{MAX}$ is the maximum value of the depth distances between each pixel in the drawn part and the observer's view point.

In a Step S620, the z-culling engine 520 obtains the calculated draw mask DM, draw maximum depth value $ZD_{MAX}$, and draw minimum depth value $ZD_{MIN}$. Moreover, according to the draw mask DM, the draw minimum depth value $ZD_{MIN}$, the maximum depth value $ZD_{MAX}$, as well as the related mask and depth information in the Z cache memory 540, the Z-culling process in the present embodiment is performed, so as to determine whether to discard the corresponding drawn part. The Z-culling process in Step S620 of FIG. 6 is the Z-culling method described in the present embodiment, and the details of the method are further elaborated in FIG. 7.

The process is now going to a Step S630 of FIG. 6. The Z-buffering engine 570 is coupled to the Z-culling engine 520. When the corresponding drawn part is kept and not discarded, the Z-buffering engine 570 performs a Z-buffering process by using the not discarded drawn part coordinated with the Z-buffer 575 in the system memory 590, so as to update the pixels in the tile. In a Step S640, the pixel rendering engine 580 coupled to the Z-culling engine 570 performs a pixel rendering process according to the updated tile pixels, so as to display the updated tile pixels on the screen of the display unit 440 in FIG. 4.

Figure 7:
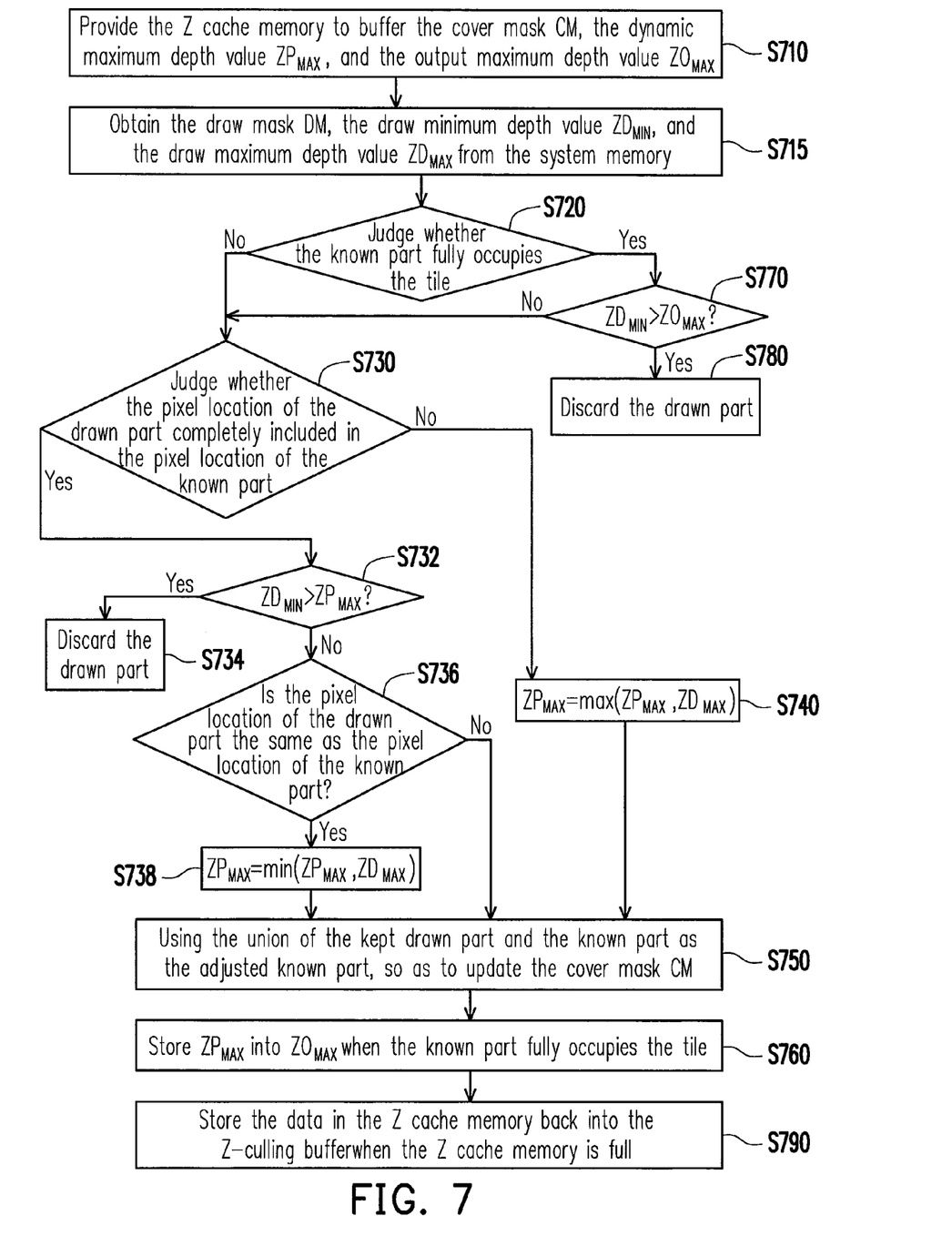
FIG. 7 is a flow diagram of a Step S620 in FIG. 6 according to an exemplary embodiment.

The Z-culling process of the present embodiment is described in detail hereafter. FIG. 7 is a flow chart of Step S620 in FIG. 6 according to an exemplary embodiment. The Z-culling engine 520 in FIG. 5 is used in support of FIG. 7 to describe the Z-culling process.

In a Step S710, the Z-culling engine 520 provides a Z cache memory 540 having a plurality of cache lines. Each of the cache lines can buffer a cover mask CM, a dynamic maximum depth value $ZP_{MAX}$, and an output maximum depth value $ZO_{MAX}$ corresponding to each tile. The dynamic maximum depth value $ZP_{MAX}$ represents the maximum value of the depth distances between each pixel in the drawn parts of the tile and the observer's view point. The output maximum depth value $ZO_{MAX}$ is a parameter used when the corresponding tile has been fully drawn. When each drawn part in the tile has depth values not at infinity, the dynamic maximum depth value $ZP_{MAX}$ is stored into the output maximum depth value $ZO_{MAX}$. Moreover, the output maximum depth value $ZO_{MAX}$ is used for the subsequent 3D graphics processing steps.

Figure 8:
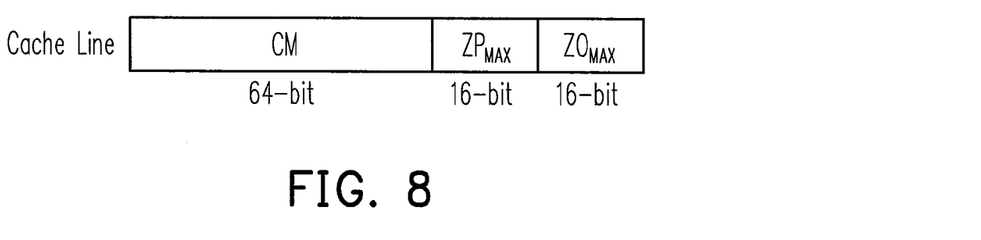
FIG. 8 schematically illustrates the fields of the cache lines in a Z cache memory according to an exemplary embodiment.

FIG. 8 schematically illustrates the fields of the cache lines in the Z cache memory 540 according to an exemplary embodiment. In the present embodiment, since the tile is a rectangular region of 8×8 pixels, the cover mask CM field is 64-bit, and each bit corresponds to a coverage state of a pixel. That is, "1" represents the pixel is being covered, and "0" represents the pixel is not being covered. Accordingly, the pixel location of the known part KP can be known from the cover mask CM. In the present embodiment, the dynamic maximum depth value $ZP_{MAX}$ and the output maximum depth value $ZO_{MAX}$ are both 16-bit. Using the tile (8,5) in FIG. 1 as an example, since the drawn part 210 is calculated first (i.e. the known part KP), the cover mask CM of the corresponding tile is as shown in FIG. 3, and the dynamic maximum depth value $ZP_{MAX}$ is set to "0.4". Moreover, since the tile (8,5) is not fully drawn, the output maximum depth value $ZO_{MAX}$ is not used at the moment and is therefore initialized to "0", although embodiments of the invention are not limited thereto. When the tile is fully drawn, the output maximum depth value $ZO_{MAX}$ is set to the dynamic maximum depth value $ZP_{MAX}$, and the initialized value (e.g. "0") is overwritten, and therefore the output maximum depth value $ZO_{MAX}$ may be initialized to an arbitrary value.

With reference to FIGS. 5 and 7, in a Step S715, the Z read module 530 obtains the draw mask DM, the draw maximum depth value $ZD_{MAX}$, and the draw minimum depth value $ZD_{MIN}$ calculated in Step 610 of FIG. 6, and the drawn part DP to update in the tile can be known according to the draw mask DM. Using the tile (8,5) in FIG. 1 as an example, when the drawing of the drawn part 220 begins, the draw mask DM is as shown in FIG. 3, and therefore the drawn part DP is the drawn part 220. Moreover, the draw maximum depth value $ZD_{MAX}$ is set to "0.6", and the draw minimum depth value $ZD_{MIN}$ is set to "0.8". The Z test module 550 then judges whether the known part KP occupies the entire tile (Step S720).

If the known part KP does not occupy the entire tile, for instance, the drawn part 210 in this example does not occupy the entire tile, the Z test module 550 continues to judge whether the pixel location of the drawn part DP is completely included in the pixel location of the known part KP (Step S730). For example, in this example, whether the drawn part 220 (drawn part DP) is completely included in the drawn part 210 (known part KP) is judged. In the present embodiment, the Z test module 550 may perform a logic AND (&) operation on the cover mask CM and the draw mask DM. If the logic AND result is equal to the draw mask DM, the pixel location of the drawn part DP is completely included in the pixel location of the known part KP (going from Step S730 to Step 732). For example, the drawn part 210 (known part KP) completely includes the drawn part 220 (drawn part DP). On the other hand, if the logic AND result does not equal to the draw mask DM, the pixel location of the drawn part DP is not completely included in the pixel location of the known part KP (going from Step S730 to Step 740). The tile (7,3) in FIG. 1 is an example of this scenario.

In a Step 732, when the draw minimum depth value $ZD_{MIN}$ is greater than the dynamic maximum depth value $ZP_{MAX}$ (going from Step S732 to Step S734), the Z test module 550 judges that the drawn part DP has been covered by the known part KP. Accordingly, the drawn part DP is ignored or discarded in the subsequent graphics processing steps. As shown in this example, the draw minimum depth value $ZD_{MIN}$ "0.6" is greater than the dynamic maximum depth value $ZP_{MAX}$ "0.4", and thus the drawn part 220 (drawn part DP) is covered by the drawn part 210 (known part KP). Accordingly, the drawn part 220 (drawn part DP) is discarded.

Conversely, when the draw minimum depth value $ZD_{MIN}$ is not greater than the dynamic maximum depth value $ZP_{MAX}$, the drawn part DP is not discarded, and Step S732 enters into Step S736. The Z test module 550 judges whether the pixel location of the drawn part DP is the same as the pixel location of the known part KP. If Step S736 is negative, then Step S750 is directly entered. On the other hand, if Step S736 is positive, the Z update module 560 stores and updates the dynamic maximum depth value $ZP_{MAX}$ to the smaller value between the draw maximum depth value $ZD_{MAX}$ and the dynamic maximum depth value $ZP_{MAX}$ (Step S738), and the process enters Step S750. Step S738 may be represented as an equation (1):

$$ZP_{MAX}=\min(ZP_{MAX},ZD_{MAX}) \qquad (1)$$

In Step S730, when the pixel location of the drawn part DP is not completely included in the pixel location of the known part KP, for instance in the tile (7,3) of FIG. 1, then the drawn part DP is not discarded and the process enters into Step S740. The Z update module 560 stores and updates the dynamic maximum depth value $ZP_{MAX}$ to the larger value between the draw maximum depth value $ZD_{MAX}$ and the dynamic maximum depth value $ZP_{MAX}$ (Step S740), and the process enters Step S750. Accordingly, Step S740 may also be represented as an equation (2):

$$ZP_{MAX}=\max(ZP_{MAX},ZD_{MAX}) \qquad (2)$$

In a Step 750, the Z update module 560 uses a union of the undiscarded (or kept) drawn part DP and the known part KP as the adjusted known part KP, and accordingly updates the cover mask CM. In the present embodiment, the Z update module 560 may store a result from a logic OR (|) operation on the cover mask CM and the draw mask DM into the cover mask CM, and thereby complete Step S750.

In Step 760 of the present embodiment, when the known part KP has occupied the entire tile, that is, each bit of the updated cover mask CM is "1", this tile no longer has any pixel with depth value at infinity. The Z update module 560 accordingly stores the dynamic maximum depth value $ZP_{MAX}$ into the output maximum depth value $ZO_{MAX}$. Since the depth values of all of the pixels in the entire tile are not at infinity, that is, each pixel point in the tile has an object, therefore, by using the output maximum depth value $ZO_{MAX}$ to represent the depth of the entire tile, computations can be simplified in some special scenarios. The disclosure hereafter describes this scenario.

Accordingly, in a next iteration, when the draw mask DM, the draw maximum depth value $ZD_{MAX}$, and the draw minimum depth value $ZD_{MIN}$ of the corresponding tile are read in Step S715, and the known part KP has already occupied the entire tile is judged (Step S720), the Z test module 550 can determine whether the drawn part DP has been covered by the known part KP by determining whether the draw minimum depth value $ZD_{MIN}$ is greater than the output maximum depth value $ZO_{MAX}$ (Step S770). Therefore, the process enters Step 780 to directly discard this drawn part DP. On the other hand, if Step S770 is negative, then the process enters Step S730 to continue the Z-culling method.

In addition, according to the capacity or the number of cache lines in the Z cache memory 540, the Z cache memory 540 may not be able to buffer the cover mask CM, the dynamic maximum depth value $ZP_{MAX}$, and the output maximum depth value $ZO_{MAX}$ of each tile. Therefore, a Step S790 is added after Step S760 in the Z-culling method of the present embodiment. When the Z test module 550 detects that the Z cache memory 540 is full, the data in the Z cache memory 540 is stored back in the Z-culling buffer 525 of the system memory. Accordingly, the data related to the cover mask CM, the dynamic maximum depth value $ZP_{MAX}$, and the output maximum depth value $ZO_{MAX}$ can be saved.

Based on the disclosure above, when the process enters Step S750 after executing Steps S738 and S740, for example, and when Step S736 is negative, the Z-culling method cannot be used to crop the 3D object. Therefore, when the Z-culling engine 520 enters Step 750, at the same time the 3D graphics processing apparatus 480 of the present embodiment uses the Z-buffering engine 570 to simultaneously execute Step S630 in FIG. 6, thereby increasing the efficiency of the real-time graphics processing. In other embodiments, the 3D graphics processing apparatus 480 may also execute Step S630 in FIG. 6 after Step S790 in FIG. 7 has been executed, and embodiments of the invention are not limited thereto.

Each cache line in the present embodiment includes the output maximum depth value $ZO_{MAX}$, although embodiments of the invention are not limited thereto, and this field data may be omitted. In other words, Steps S720, S760, S770, and S780 in the flow diagram of FIG. 7 can be omitted.

Figure 9A:
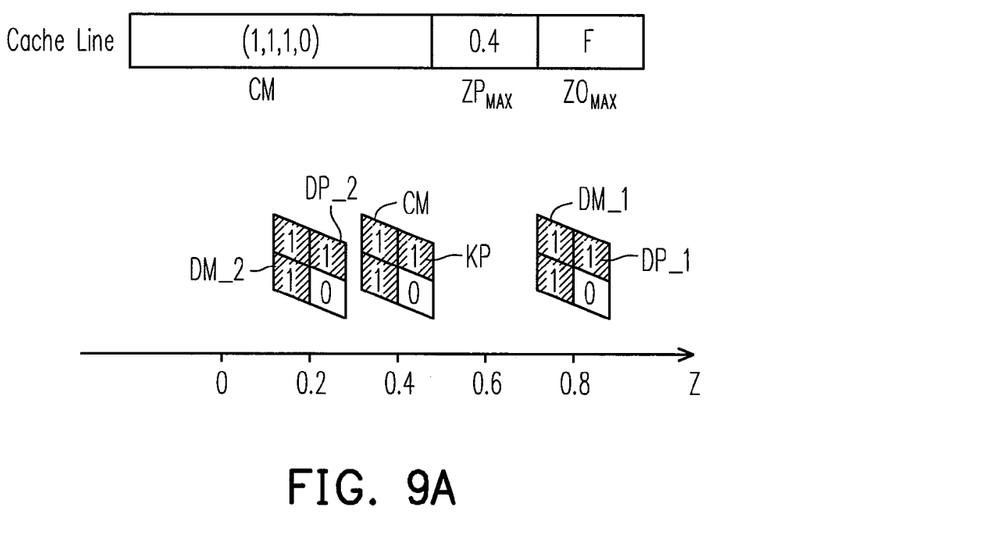
FIGS. 9A and 9B are schematic views of Z-culling process examples and the depth directions thereof according to an exemplary embodiment.
Figure 9B:
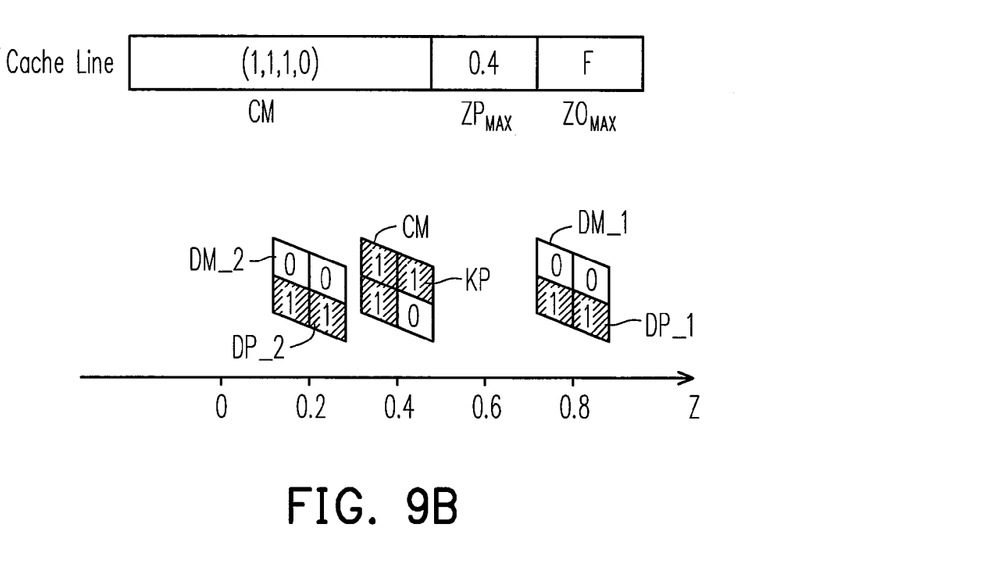

Accordingly, FIGS. 9A and 9B are used as examples to further illustrate the embodiments of the invention, and FIGS. 9A and 9B are schematic views of examples of a Z-culling process and the depth directions thereof. In FIGS. 9A and 9B, a 2×2 tile is used in the example, and so the cover mask CM and the draw masks DM_1-DM_2 are all 2×2 masks.

With reference to FIG. 9A, assume the cover mask CM in a cache line is (1,1,1,0), the dynamic maximum depth value $ZP_{MAX}$ is "0.4", and the output maximum depth value $ZO_{MAX}$ is preset at infinity "F". Moreover, the known part KP is presented as the slanted part in the cover mask CM. The draw masks DM_1 and DM_2 are both (1,1,1,0). The draw maximum depth value $ZD_{MAX}$ and the draw minimum depth value $ZD_{MIN}$ corresponding to the draw mask DM_1 are "0.8", and the draw maximum depth value $ZD_{MAX}$ and the draw minimum depth value $ZD_{MIN}$ corresponding to the draw mask DM_2 are "0.2". The draw masks DM_1 and DM_2 respectively correspond to the drawn parts DP_1 and DP_2 to update.

With reference to FIGS. 7 and 9A, when the Z read module 530 reads the draw mask DM_1 and the draw minimum depth value $ZD_{MIN}$ "0.8" thereof in Step S715, the known part KP has not occupied the entire tile (Step S720), the pixel location of the drawn part DP_1 to update is not completely included in the pixel location of the known part KP (Step S730), and the draw minimum depth value $ZD_{MIN}$ "0.8" is greater than the dynamic maximum depth value $ZP_{MAX}$ "0.4" (Step S732). Accordingly, as shown in FIG. 9A, the pixel location of the drawn part DP_1 to update has been completely included by the known part KP. Therefore, this drawn part DP_1 needs to be discarded.

On the other hand, when the draw mask DM_2 and the draw minimum depth value $ZD_{MIN}$ "0.2" thereof have already been read in Step S715, the known part KP has not occupied the entire tile (Step S720), the pixel location of the drawn part DP_2 to update is completely included in the pixel location of the known part KP (Step S730), the draw minimum depth value $ZD_{MIN}$ "0.2" is not greater than the dynamic maximum depth value $ZP_{MAX}$ "0.4" (Step S732), and the pixel location of the known part KP is the same as the pixel location of the drawn part DP_2 (Step S736). Accordingly, as shown in FIG. 9A, the drawn part DP_2 to update is drawn on the screen, and all the pixel locations in the tile are drawn to "0.2" from the original "0.4". Therefore, Step S738 draws the smaller value (i.e. "0.2") between the draw maximum depth value $ZD_{MAX}$ "0.2" and the dynamic maximum depth value $ZP_{MAX}$ "0.4". Moreover, Step S750 stores a result (1,1,1,0) of the union of the cover mask (1,1,1,0) and the draw mask (1,1,1,0) in the cover mask CM, and Steps S630-S640 in FIG. 6 can be used to perform the Z-buffering process and the pixel rendering process.

With reference to FIGS. 7 and 9B, a difference between 9A and 9B is that the draw masks DM_1 and DM_2 in FIG. 9B are (0,0,1,1). Accordingly, when the Z read module 530 reads the draw mask DM_1 and the draw minimum depth value $ZD_{MIN}$ "0.8" thereof in Step S715, then as shown in FIG. 9B, the pixel location of the drawn part DP_1 is not completely included in the pixel location of the known part KP (Step S730). Therefore, after the pixel rendering process, a portion of the depth values of the updated pixels in the known part KP is "0.4", and another portion of depth values of the updated pixels (e.g. the pixels in the bottom right corner of the tile) is "0.8".

Accordingly, in Step S740, the larger value (i.e. "0.8") between the draw maximum depth value $ZD_{MAX}$ "0.8" and the dynamic maximum depth value $ZP_{MAX}$ "0.4" is stored into the dynamic maximum depth value $ZP_{MAX}$. Moreover, in Step S750, a result (1,1,1,1) of the union of the cover mask CM (1,1,1,0) and the draw mask DM (0,0,1,1) is stored into the cover mask CM. Since the known part KP has occupied the entire tile, that is, when the cover mask CM is (1,1,1,1), the dynamic maximum depth value $ZP_{MAX}$ "0.8" is stored into the output maximum depth value $ZO_{MAX}$ of the cache line in Step S760.

On the other hand, with reference to FIGS. 7 and 9B, when the Z read module 530 reads the draw mask DM_2 and the draw minimum depth value $ZD_{MIN}$ "0.2" thereof in Step S715, then as shown in FIG. 9B, the pixel location of the drawn part DP_2 is not completely included in the pixel location of the known part KP (Step S730). Therefore, after the pixel rendering process, a portion of the depth values of the updated pixels in the known part KP is "0.4", and another portion of depth values of the updated pixels (e.g. the pixels in the bottom right corner of the tile) is "0.2". Accordingly, in Step S740, the larger value (i.e. "0.4") between the draw maximum depth value $ZD_{MAX}$ "0.2" and the dynamic maximum depth value $ZP_{MAX}$ "0.4" is stored into the dynamic maximum depth value $ZP_{MAX}$. Moreover, the related operations in Steps 750 and 760 are executed, and further elaboration thereof is omitted hereafter.

In view of the foregoing, according to embodiments of the invention, an exclusive Z cache memory is added in the Z-buffer module so that when the Z-culling method is performed, the cache memory is employed to reduce the read and write frequency on the system memory. When performing Z-culling methods in the past, frequent read and write operations need to be performed on the Z-culling buffer in the system memory. Embodiments of the invention move the frequently read and written data (e.g. masks and depth data) from the Z-culling buffer to the cache memory for processing. Accordingly, the access frequency of the system memory is lowered and the bandwidth taken up is reduced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A Z-culling method adapted for a three-dimensional (3D) graphics processing apparatus, the Z-culling method comprising:

providing a Z cache memory to buffer a cover mask and a dynamic maximum depth value corresponding to one of a plurality of tiles of a rasterized screen, wherein the cover mask represents a pixel location of a known part in said one of the plurality of tiles, and the dynamic maximum depth value is the maximum depth value of all pixels in the known part corresponding to a view point;

obtaining a draw mask, a draw maximum depth value, and a draw minimum depth value calculated according to said one of the plurality of tiles and a drawn part, wherein the drawn part are pixels of a plane constructing a 3D graphics projected on said one of the plurality of tiles, the draw mask represents the pixel location of the drawn part in said one of the plurality of tiles, the draw minimum depth value is a minimum depth value of all pixels in the drawn part corresponding to the view point, and the draw maximum depth value is a maximum depth value of all pixels in the drawn part corresponding to the view point;

judging whether the pixel location of the drawn part is completely included in the pixel location of the known part, and coordinating with a comparison of the draw minimum depth value and the dynamic maximum depth value, so as to determine whether to discard the drawn part and whether to update the cover mask and the dynamic maximum depth value in the Z cache memory;

maintaining the dynamic maximum depth value when the pixel location of the drawn part is completely included in the pixel location of the known part and the pixel location of the drawn part does not equal to the pixel location of the known part, and the draw minimum depth value is not greater than the dynamic maximum depth value; and updating the dynamic maximum depth value to a smaller value between the draw maximum depth value and the dynamic maximum depth value, when the pixel location of the drawn part is equal to the pixel location of the known part and the draw minimum depth value is not greater than the dynamic maximum depth value, wherein the cover mask and the dynamic maximum depth value corresponding to said one of the tiles are obtained from a system memory and then buffered in the Z cache memory.

2. The Z-culling method as claimed in claim 1, further comprising:

when the Z cache memory is full, storing the data in the Z cache memory back in the system memory of the 3D graphics processing apparatus, wherein the system memory is coupled to the Z cache memory.

3. The Z-culling method as claimed in claim 1, wherein the method further comprises:

discarding the drawn part when the pixel location of the drawn part is completely included in the pixel location of the known part and the draw minimum depth value is greater than the dynamic maximum depth value.

4. The Z-culling method as claimed in claim 1, wherein the method further comprises:

keeping the drawn part and adjusting the dynamic maximum depth value when the pixel location of the drawn part is not completely included in the pixel location of the known part, or when the pixel location of the drawn part is completely included in the pixel location of the known part and the draw minimum depth value is not greater than the dynamic maximum depth value; and using a union of the kept drawn part and the known part as an adjusted known part, so as to update the cover mask.

5. The Z-culling method as claimed in claim 4, wherein the method further comprises:

updating the dynamic maximum depth value to a larger value between the draw maximum depth value and the dynamic maximum depth value, when the pixel location of the drawn part is not completely included in the pixel location of the known part.

6. The Z-culling method as claimed in claim 1, wherein the Z cache memory further buffers an output maximum depth value corresponding to said one of the plurality of tiles, the method comprise:

when the known part fully occupies said one of the plurality of tiles, the dynamic maximum depth value is stored into the output maximum depth value; and when the draw minimum depth value is greater than the output maximum depth value, the drawn part is discarded.

7. A 3D graphics processing apparatus using Z-culling, adapted for displaying a 3D scene on a screen, the 3D graphics processing apparatus comprising:

a geometry conversion module taking apart the 3D scene to form at least a plane, and rasterizing the screen into a plurality of tiles, so as to calculate a draw mask, a draw maximum depth value, and a draw minimum depth value according to one of the tiles and a drawn part, wherein the drawn part is the pixels of the plane projected to said one of the tiles, the draw mask represents a pixel location of the drawn part in said one of the tiles, the draw minimum depth value is the minimum depth value of all pixels in the drawn part corresponding to a view point, and the draw maximum depth value is the maximum depth value of all pixels in the drawn part corresponding to the view point;

a Z-culling engine coupled to the geometry conversion module, the Z-culling engine performing a Z-culling process according to the draw mask, the draw maximum depth value, and the draw minimum depth value, so as to determine whether to discard the drawn part, wherein the Z-culling engine comprises:

a Z read module obtaining from a system memory the draw mask, the draw maximum depth value, and the draw minimum depth value corresponding to the drawn part and said one of the tiles;

a Z cache memory coupled to the Z read module, the Z cache memory buffering a cover mask and a dynamic maximum depth value corresponding to said one of the tiles, the cover mask representing a pixel location of a known part in said one of the tiles, and the dynamic maximum depth value is the maximum depth value of the pixels in the known part, wherein the cover mask and the dynamic maximum depth value corresponding to said one of the tiles are obtained from the system memory and then buffered in the Z cache memory;

a Z test module coupled to the Z read module and the Z cache memory, the Z test module judging whether the pixel location of the drawn part is completely included in the pixel location of the known part, and coordinating with a comparison of the draw minimum depth value and the dynamic maximum depth value, so as to determine whether to discard the drawn part; and a Z update module coupled to the Z test module and the Z cache memory, the Z update module updating the cover mask and the dynamic maximum depth value of the Z cache memory according to a determined result of the Z test module, wherein the Z update module maintains the dynamic maximum depth value when the pixel location of the drawn part is completely included in the pixel location of the known part and the pixel location of the drawn part does not equal to the pixel location of the known part, and the draw minimum depth value is not greater than the dynamic maximum depth value; and the Z update module updates the dynamic maximum depth value to a smaller value between the draw maximum depth value and the dynamic maximum depth value, when the pixel location of the drawn part is equal to the pixel location of the known part and the draw minimum depth value is not greater than the dynamic maximum depth value;

a Z-buffering engine coupled to the Z-culling engine, the Z-buffering engine performing a Z-buffering process when the drawn part is determined to be kept, so as to update the pixels of said one of the tiles; and a pixel rendering engine coupled to the Z-buffering engine, the pixel rendering engine performing a pixel rendering process according to the updated pixels of said one of the tiles.

8. The 3D graphics processing apparatus as claimed in claim 7, wherein when the Z cache memory is full, the data in the Z cache memory is stored back in the system memory of the 3D graphics processing apparatus, wherein the system memory is coupled to the Z cache memory.

9. The 3D graphics processing apparatus as claimed in claim 7, wherein the Z test module discards the drawn part when the pixel location of the drawn part is completely included in the pixel location of the known part and the draw minimum depth value is greater than the dynamic maximum depth value.

10. The 3D graphics processing apparatus as claimed in claim 7, wherein the Z update module keeps the drawn part and adjusts the dynamic maximum depth value when the pixel location of the drawn part is not completely included in the pixel location of the known part, or when the pixel location of the drawn part is completely included in the pixel location of the known part and the draw minimum depth value is not greater than the dynamic maximum depth value, and wherein the Z update module uses a union of the kept drawn part and the known part as an adjusted known part, so as to update the cover mask.

11. The 3D graphics processing apparatus as claimed in claim 10, wherein the Z update module updates the dynamic maximum depth value to a larger value between the draw maximum depth value and the dynamic maximum depth value, when the pixel location of the drawn part is not completely included in the pixel location of the known part.

12. The 3D graphics processing apparatus as claimed in claim 7, wherein the Z cache memory further buffers an output maximum depth value corresponding to said one of the tiles,
wherein when the known part fully occupies said one of the tiles, the Z update module stores the dynamic maximum depth value as the output maximum depth value, and,
when the draw minimum depth value is greater than the output maximum depth value, the Z test module discards the drawn part.

* * * * *